SPEECH-SIGNAL TRANSMISSION SYSTEM

Filed March 26, 1959 3 Sheets-Sheet 1

INVENTOR
FRANK DE JAGER
PETRUS JOSEPHUS VAN GERWEN
BY
[signature]
AGENT

SPEECH-SIGNAL TRANSMISSION SYSTEM

Filed March 26, 1959 3 Sheets-Sheet 2

INVENTOR
FRANK DE JAGER
PETRUS JOSEPHUS VAN GERWEN
BY
Frank R. Jifari
AGENT

INVENTOR
FRANK DE JAGER
PETRUS JOSEPHUS VAN GERWEN
BY
Frank R. Jufari
AGENT 3,102,929

SPEECH-SIGNAL TRANSMISSION SYSTEM

Frank de Jager and Petrus Josephus van Gerwen, Eindhoven, Netherlands, assignors to North American Philips Company, Inc., New York, N.Y., a corporation of Delaware

Filed Mar. 26, 1959, Ser. No. 802,165
Claims priority, application Netherlands May 3, 1958
12 Claims. (Cl. 179—15.55)

The invention relates to a speech-signal transmission system, comprising a transmitter with a band compression device and a receiver with a band expansion device, wherein the band compression device comprises a plurality of parallel channels, which are fed by signals lying in different formant ranges, one of these channels (the first-mentioned channel) allowing the lowest formant range to pass with natural fidelity, the other channels comprising a band compressor, whereas the band expansion device comprises a corresponding number of parallel channels, which are fed by signals representing the various formant ranges, the receiving channel corresponding with the first-mentioned transmitting channel (the first-mentioned receiving channel) allowing the incoming signals to pass with natural fidelity, the other channels comprising a band expander.

In order to obtain the band compression and band expansion this transmitting system utilizes the properties of speech signals, the speech signal being split up by the division into formant ranges in those frequency ranges which comprise the modulations of the resonance frequencies of the mouth cavity, the pharynx and the nasal cavity, i.e. formant frequencies. The three lowest formant ranges are lying, for example, in the frequency bands from 300 to 800 c./s., 800 to 2000 c./s. and 2000 to 3200 c./s.

In a known transmission system of the aforesaid kind the band compression at the transmitter end was achieved by compressing the modulation frequencies of the higher formant ranges lying in the frequency bands from 800 to 2000 c./s. and from 2000 to 3200 c./s. by frequency division with a factor 10 to a tenfold smaller frequency range and by restoring at the receiver end the correct frequency ratio by frequency multiplication with a factor 10. With a total compression factor of 4 a reasonable transmission quality was obtained with this transmission system.

The invention has for its object to provide a new structure of a transmission system of the above-mentioned kind, in which an improved transmission quality is obtained with the same band compression factor, inter alia by avoiding interference tones.

In accordance with the invention each of the signals lying in the higher formant regions associated with the corresponding band compression channels is fed to a formant frequency detector, which supplies a voltage which varies with the formant frequency of the signals in the associated higher formant region, whilst the band expander in the cooperating band expansion channels comprises a band shifting device which is fed by the signals of the lowest formant region allowed to pass with natural fidelity, which signals are shifted in frequency in the band shifting device within the associated higher formant region by an oscillation, of which the frequency varies with the output voltage of the formant frequency detector in the corresponding band compression channel.

The invention and its advantages will now be described more fully with reference to the figures.

Figure 1:
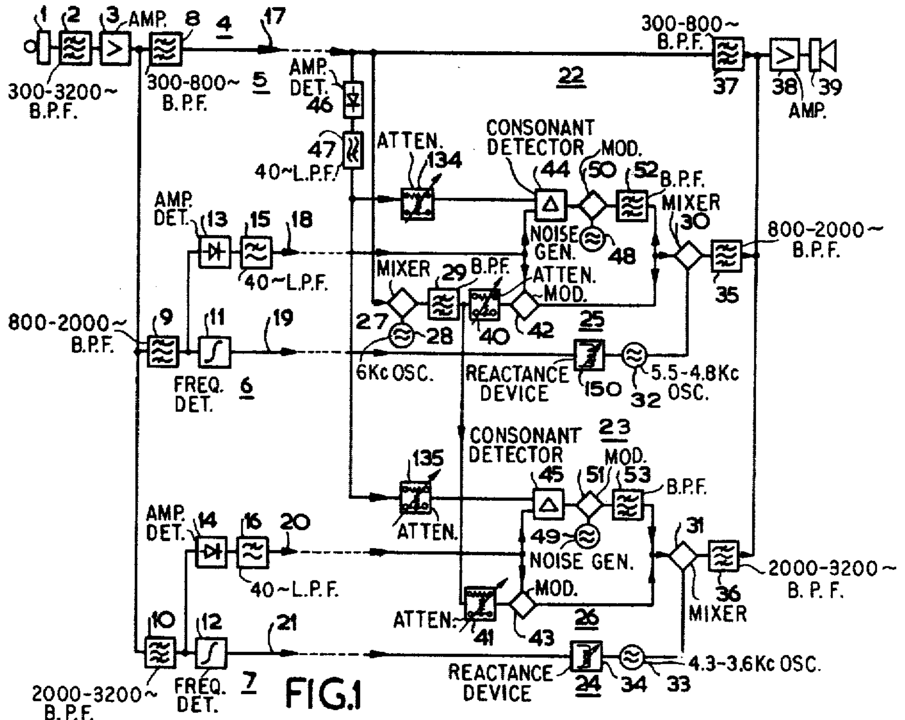
FIG. 1 shows, for further explanation of the invention, a diagrammatical embodiment of a transmitter and a receiver used in a transmitted apparatus according to the invention.

In the transmitter shown in FIG. 1 the signals obtained from a microphone 1 are fed via a filter 2, which allows speech signals between 300 and 3200 c./s. to pass, subsequent to amplification in an amplifier 3, to a band compression device 4, which comprises three parallel-connected channels 5, 6 and 7. Each of these parallel-connected channels comprises an input filter 8, 9 and 10 respectively, which allows the signals in the formant regions of 300–800 c./s., 800–2000 c./s. and 2000–3200 c./s. respectively to pass; the channel 5 passes with natural fidelity the signals of the lowest formant region of 300–800 c./s., whereas the speech signals of the higher formant regions of 800–2000 c./s. and 2000–3200 c./s. in the channels 6 and 7 are fed to a formant frequency detector 11, 12, which supplies a direct voltage which varies with the formant frequency in the formant regions of 800–2000 c./s. and 2000–3200 c./s., and of which the band width required for transmission may be, for example 30 c./s.

To the output circuits of the input filters 9, 10 are moreover connected an amplitude detector 13, 14 and a low-bandpass filter 15, 16 with a limit frequency of, for example, 40 c./s. to produce a voltage varying with the level of the signals in the formant regions of 800–2000 c./s. and 2000–3200 c./s., which voltage, together with the output voltages of the formant frequency detectors 11, 12 is transmitted to the receiver end.

For the sake of simplicity in the apparatus shown diagrammatically the signals of the first formant region, the output voltages of the formant frequency detectors 11, 12 and the output voltages of the amplitude detectors 13, 15 and 14, 16 are transmitted to the receiver end via separate conductors 17, 18, 19, 20, 21. In the practical embodiment the transmission of these different signals for one conductor is preferably carried out in the manner to be described with reference to FIGS. 4 and 5.

Compared with the bandwidth of the initial speech signal of 2.9 kc./s., a material economy in bandwith is obtained in this case, i.e. the total bandwidth of the transmitted signals is $500+2\times30+2\times40=640$ c./s., whilst, in addition, the speech signal transmitted with bandcompression can be reproduced with particularly good quality at the receiver end.

The receiver co-operating with the transmitter described comprises a number of parallel-connected channels 22, 23, 24, corresponding to those of the transmitter and being fed via conductors 17, 18, 19, 20, 21 by the signals representing different formant regions; the receiving channel 22, which corresponds with the transmitter channel 5, passes with natural fidelity the incoming signals of the lowest formant region of 300–800 c./s., whereas the further receiving channels 23, 24 comprise each a band expander.

Each of the band expanders in the band expansion channels 23, 24 is formed by a band shifting device 25, 26 respectively, fed by the signals of the first formant region (300–800 c./s.), transmitted with natural fidelity and shifted in frequency within the formant region of 800–2000 c./s. and 2000–3200 c./s. by an oscillation, of which the frequency varies with the output voltage of the formant frequency detectors 11 and 12 respectively in the band compression channels 6 and 7 respectively. In the device described this band shift is obtained by transposition of the signals of the lowest formant region of 300–800 c./s. first in a mixing stage 27 with a local oscillator 28, connected thereto and having a frequency of, for example, 6 kc./s., and an output filter 29, into the frequency band of 6.3 to 6.8 kc./s. and by shifting the frequency band of 6.3–6.8 kc./s. thus obtained in mixing stages 30 and 31 in the channels 23 and 24 respectively to the formant regions of 0.8 to 2 kc./s. and 2–3.2 kc./s. with the aid of local oscillators 32 and 33 respectively, of which the frequencies in the frequency ranges of 5.5–4.8 kc./s. and 4.3–3.6 kc./s. respectively are varied with the aid of reactance devices 150 and 34 respectively, for example reactance valves, which are controlled via conductors 19 and 21 respectively by the output voltages of the formant frequency detectors 11 and 12 respectively. The mixing stage 27 is constructed so that the excessive amplitude peaks of the signals in the lowest formant region are limited.

In the manner described the signals of the lowest formant region of 300–800 c./s., transmitted with natural fidelity, are varied in frequency within the higher formant regions of 800–2000 c./s. and 2000–3200 c./s. in accordance with the output voltages of the formant frequency detectors 11 and 12 respectively, the signals thus obtained are supplied, via output filters 35 and 36 with pass ranges of 800–2000 c./s. and 2000–3200 c./s. respectively, together with the signals of the first formant region in the channel 22, which comprises an output filter 37 with a pass-range of 300–800 c./s., and via a low-frequency amplifier 38 to a reproducing device 39. The speech signals reproduced in the device 39 exhibit a good reproduction quality, which is not affected by the occurrence of interference tones.

In order to enhance the reproduction quality it is advantageous to vary the signals obtained from the band expansion channels 23, 24 in the formant regions of 800–2000 c./s. and 2000–3200 c./s. in accordance with the level of the initial signals in these formant regions. In the band shifting channels 25 and 26 the signals obtained from the frequency transposition stage 27, 28, 29 are supplied via adjustable attenuators 40 and 41 respectively to amplitude modulators 42 and 43 respectively, which are governed via conductors 18 and 20 respectively, by level-control voltages produced in the amplitude detectors 13, 15 and 14, 16 respectively in the band compression channels 6, and 7 respectively. By this level control the quality of the speech signal reproduction is improved.

The receiver shown comprises furthermore means to improve the reproduction of consonants, for example the sounds of "s" and "f," which are characterized mainly by a noise-like frequency spectrum in the higher formant regions. To this end each of the band expansion channels has added to it a consonant detector 44, 45 respectively, of which the output voltage controls a normally cut-off amplitude modulator 50, 51 respectively with a noise voltage generator 48, 49 respectively, connected thereto and to the input terminals of the mixing stage 30, 31 respectively via an output circuit 52, 53 respectively with a pass range equal to the pass range of the output filter 29 of the mixing stage 27; in the embodiment shown the pass ranges of the output circuits 52 and 53 are, for example, 6.3–6.8 kc./s. The consonant detectors 44 and 45 are each formed by an amplitude comparison device to compare the amplitudes of the level of the signals of the lowest formant region with the level of the signals of the higher formant regions, the first level voltage being obtained by means of an amplitude detector 46, connected to the channel 22 and comprising a low-bandpass filter 47 with a limit frequency of, for example, 40 c./s., the level voltages being obtained from the conductors 18 and 20. For the said amplitude comparison in the consonant detectors 44 and 45 the output voltage of the amplitude detectors 46 and 47 respectively is attenuated to a suitable value with the aid of adjustable attenuators 134 and 135 respectively.

At the occurrence of a consonant the level voltage of the higher formant regions predominates and the consonant detectors 44 and 45 supply, for example, a positive output voltage, which releases the normally blocked amplitude modulators 50 and 51 respectively and modulates the noise voltage of the noise-voltage generators 48 and 49 respectively in the amplitude in accordance with the amplitude of the level difference voltage obtained from the consonant detectors 44 and 45 respectively, this noise voltage being supplied via the mixing stages 30 and 31 respectively to the reproducing device 39. Conversely, at the occurrence of a vowel, for example the sounds "a" and "e" the level voltage of the lowest formant region will predominate and the amplitude consonant detectors 44 and 45 will supply a negative output voltage, which is not capable of releasing the amplitude modulators 50 and 51 respectively, so that no noise voltage is supplied to the reproducing device 39.

As stated above, when a consonant occurs, a noise voltage of suitable value is supplied to the reproducing device 39, so that the reproduction of the consonants of a speech signal is improved. By the measures described above the total speech signal obtained from the microphone 1 is reproduced by the device 39 with a remarkable natural fidelity.

It should be noted here that the addition of noise voltage to the mixing stages 30 and 31 may be carried out in a different manner. In the embodiment described, for example, for the two channels 23 and 24, only one consonant detector may suffice, the level of the signals in the lowest formant region being then compared with the sum of the level voltages of the signals in the two higher formant regions. It has been found that this simplification does substantially not affect the transmission quality of the reproduced signals.

Figure 2:
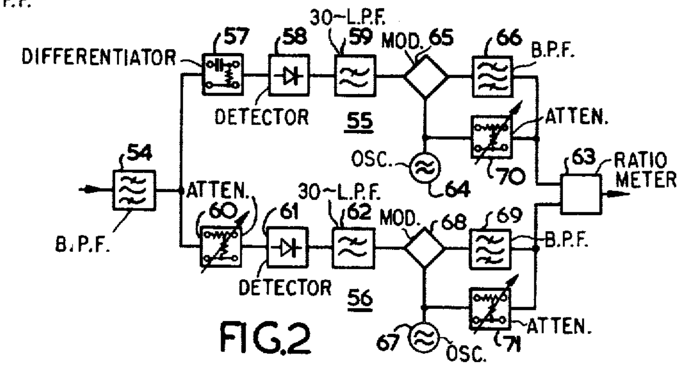
FIGS. 2 and 3 show a few embodiments of a formant frequency detector for use in a device according to the invention.
Figure 3:
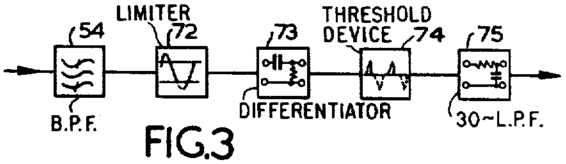

FIGS. 2 and 3 show a few embodiments of formant frequency detectors to be used in the transmission system according to the invention; with the formant frequency detector of FIG. 2 ensures an excellent reproduction quality, and FIG. 3 shows a markedly simpler embodiment, in which a slightly minor, but still excellent reproduction quality is obtained.

The formant frequency detector shown in FIG. 2 is described in detail in United States Patent No. 2,995,707 so that a short explanation may suffice.

In the case of the formant frequency detector shown in FIG. 2 the speech signal is supplied by way of a filter 54, passing the signals of the formant region of 800–2000 c./s. or 2000–3200 c./s. respectively to two parallel-connected channels 55 and 56 respectively. The channel 55 comprises the cascade connection of a differentiating network 57, an amplitude detector 58 and a low-bandpass filter 59 with a limit frequency of, for example, 30 c./s., whereas the channel 56 comprises the cascade connection of an adjustable attenuator 60, an amplitude detector 61 and a low-bandpass filter 62 with a limit frequency of, for example, 30 c./s. For frequency detection of the formant frequency varying slowly in the formant region concerned with a rate of less than 30 c./s., the output voltages of the two amplitude detectors 58, 59 and 61, 62 respectively control a ratio of meter 63 to determine the ratio between the output voltage of the amplitude detector 58, 59 and the output voltage of the amplitude detector 61, 62, the output voltage of the ratio meter 63 constituting the output voltage of the formant detector. The output voltage of the ratio meter 63 follows accurately the variation of the formant frequency and is substantially not affected by noise voltages and irregularities of the speech signals occurring particularly at low amplitude values of the speech signal.

In order to determine the ratio between the output voltages of the amplitude detectors 58, 59 and 61, 62, these direct voltages are not directly compared with one another in a practical embodiment, but first modulated on a frequency $f_1$ and $f_2$ respectively; to this end the output voltages of the amplitude detectors 58, 59 are supplied to a push-pull modulator 65, connected to an oscillator 64 with a frequency $f_1$, this modulator comprising an output circuit 66, and the output voltage of the amplitude detector 61, 62 is fed to a push-pull modulator 68, connected to an oscillator 67 with a frequency $f_2$, this modulator having an output circuit 69. By providing an adjustable attenuator 70 and 71 respectively in this embodiment between the oscillator 64, 67 respectively and the output terminal of the circuit 66 and 69 respectively, a suitable adjustment of the attenuators 70 and 71 ensures that the ratio meter 63, in the absence of a speech signal, provides an output voltage which corresponds with a frequency lying approximately in the centre of the formant region concerned. With such an adjustment the advantage is obtained, in addition, that at the occurrence of a speech signal after a pause, the formant frequency detector adjusts itself rapidly to the desired value.

FIG. 3 shows a different embodiment of a formant frequency detector to be used in the transmission system shown. With this formant frequency detector the signals, obtained from a filter 54 and lying in the formant region of 800–2000 c./s., or 2000–3200 c./s. respectively are supplied to a limiting device 72, followed by a differentiating network 73, which converts the square-wave signal obtained by the limitation into a sequence of successive positive and negative pulses, and a threshold device 74, which suppresses, for example, the negative pulses. Thus at the output circuit of the threshold device 74, a sequence of positive pulses is produced, of which the number per unit time varies with the formant frequency, so that by smoothing of these pulses in a low-bandpass filter 75 with a limit frequency of, for example, 30 c./s., a voltage is obtained, which varies with the formant frequency. In this formant frequency detector it is found to be advantageous to supply identical pulses to the low-bandpass filter 75, which may be carried out, for example by supplying the output pulses of the threshold device 74 to a pulse producer.

The formant frequency detector described with reference to FIG. 3 is distinguished by its particular simplicity, whilst nevertheless a reasonable reproduction quality is ensured. Apart from the formant frequency detectors described, the transmission system according to the invention may comprise formant frequency detectors of different type. For example, a conventional frequency detector may be used to this end; to the input circuit thereof the incoming signals are fed via a limiting device, whilst the output circuit includes a low-bandpass filter with a sufficiently low limit frequency, for example, 30 c./s.

Figure 4:
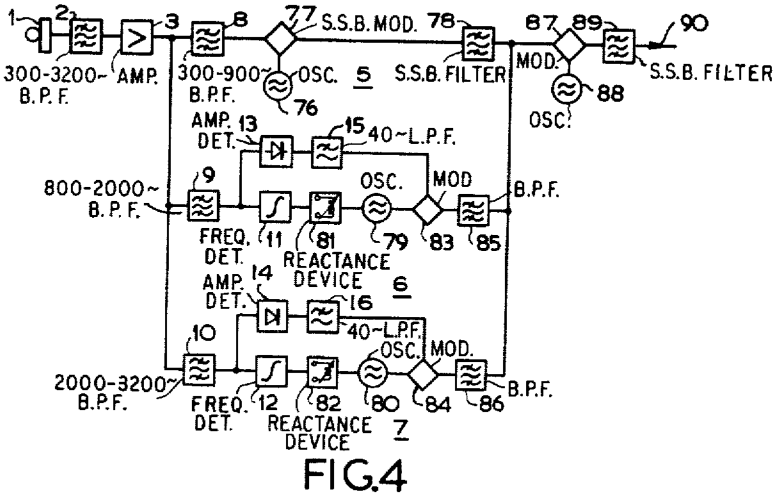
FIGS. 4 and 5 show the block diagram of a practical embodiment of a transmitter and a receiver according to the invention.
Figure 5:
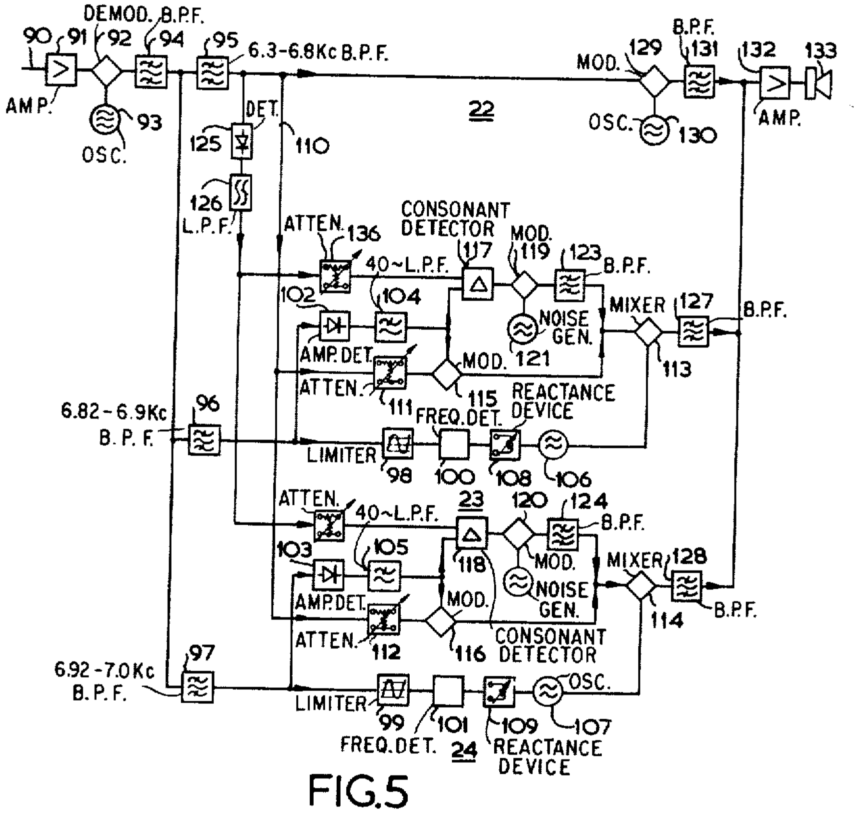

FIGS. 4 and 5 show a transmitter and a receiver respectively in a transmission system according to the invention, which is suitable for single sideband transmission. In this transmission system elements corresponding to those of FIG. 1 are designated by the same reference numerals.

In the transmitter shown in FIG. 4 the speech signals obtained from a microphone 1 are supplied in the manner described in detail with reference to FIG. 1, for band compression via the filters 8, 9 and 10 passing the various formant regions, to three channels 5, 6, 7 the signals being fed in the channels 6 and 7 to a formant frequency detector 11 and 12 respectively and to an amplitude detector 13 and 15, 14, 16 respectively to obtain a voltage which varies with the level of the signals passing the filters 9 and 10 respectively.

In the channel 5 the signals passed by the filter 8 and lying in the lowest formant region of 0.3 to 0.8 kc./s. are supplied to a single sideband modulator 77 with a single sideband filter 78, passing the upper sideband of 6.3 to 6.8 kc./s. and connected to an oscillator 76 of 6 kc./s., whilst in the channels 6 and 7 the output voltages of the formant frequency detectors 11 and 12 respectively control in frequency, by way of frequency correctors 81 and 82 respectively, the oscillators 79 and 80 respectively, whilst the oscillator voltages are amplitude-modulated in an amplitude modulator 83 and 84 respectively with an output filter 85 and 86 respectively, by the level voltages of the amplitude detectors 13, 15 and 14, 16 respectively.

In the transmitting device shown the local oscillators 79 and 80 are frequency-modulated by the output voltages of the formant frequency detectors 11 and 12 respectively, for example with a modulation depth of 1, the frequency-modulated oscillations thus obtained, the frequencies of which vary in a range of 30 c./s., being amplitude-modulated by the output voltages of the amplitude detectors 13, 15 and 14, 16 respectively in the amplitude modulators 83 and 84 respectively. The central frequencies of the oscillators 79 and 80 are, in this case, about 6.86 kc./s. and 6.96 kc./s.; the frequency spaces introduced between the single sideband signal of 6.3–6.8 kc./s. and the central oscillator frequency of the oscillator 79, and, on the other hand, between the central frequencies of the oscillators 79 and 80, are utilized for the transmission of the frequency- and amplitude modulation of the oscillations from the oscillators 79 and 80. The pass ranges of the filters 78, 85 and 86 may be chosen, for example, to be 6.30–6.80 kc./s., 6.82–6.90 kc./s. and 6.92–7.00 kc./s. respectively.

The output voltages of the channels 5, 6 and 7 are transmitted by way of a group modulator 87 with an oscillator 88 and a single-sideband filter 89 to a cable 90 by single-sideband modulation. The bandwidth of the output signal fed to the conductor 90 is about 0.7 kc./s., so that with respect to the initial speech signal (2.9 kc./s.) a marked economy in bandwidth is obtained.

FIG. 5 shows the receiver which co-operates with a transmitter as shown in FIG. 4.

The incoming single-sideband signals originating from the transmission cable 90 are supplied, subsequent to high-frequency amplification in an amplifier 91, by way of a group demodulator 92 with an oscillator 93 connected thereto and an output filter 94, to reobtain the initial speech signal, to a band expansion device comprising three parallel-connected channels 22, 23, 24, which correspond with the channels 5, 6, 7 respectively in the transmitter.

The channels 22, 23, 24 comprise each an input filter 95, 96, 97 respectively, which split up the single-sideband signal obtained from the group demodulator 92, lying for example in the frequency band of 6.3–7.0 kc./s., into signals representing the three formant regions of 6.30–6.80 kc./s., 6.82–690 kc./s. and 6.92–7.00 kc./s.; the single-sideband signal of 6.30–6.80 kc./s. is passed through the channel 22 with natural fidelity, whereas the signals associated with the expansion channels 23 and 24 are fed, on the one hand, via limiting devices 98 and 99 respectively, to frequency detectors 100 and 101 respectively and, on the other hand, to amplitude detectors 102 and 103 respectively, comprising low-bandpass filters 104 and 105 respectively with a limit frequency of, for example, 40 c./s.

At the output circuits of the frequency detectors 100 and 101 and the amplitude detectors 102, 104 and 103, 105 occur voltages which vary with the format frequency and with the level of the signals in the formant regions of 800–200 c./s. and 2000–3200 c./s respectively, which signals are further treated as described with reference to FIG. 1. The output voltages of the frequency detectors 100 and 101 modulate in frequency the voltages of local oscillators 106 and 107 respectively via reactance devices 108 and 109 respectively in the frequency ranges of 5.5–4.8 kc./s. and 4.3–3.6 kc./s. respectively, in order to obtain a frequency shift of the signals obtained from the filter 95 in the first formant region in the frequency band of 6.3–6.8 kc./s., which signals are fed via the conductor 110 and adjustable attenuators 111 and 112 respectively to the band expansion channels 23 and 24 respectively, this frequency shift occurring in the mixing stages 113 and 114 respectively, whereas the output voltages of the amplitude detectors 102, 104 and 103, 105 are used for level control in the amplitude modulators 115 and 116 respectively.

The band expansion channels 23 and 24 comprise, moreover, each a consonant detector 117 and 118 respectively, similarly to the transmission system shown in FIG. 1, furthermore, an amplitude modulator 119 and 120 respectively with a noise-voltage generator 121 and 122 respectively, connected thereto, and an output filter 123 and 124 respectively; the consonant detectors 117 and 118 are controlled in the manner shown in FIG. 1 via adjustable attenuators 136 and 137 respectively, by a voltage which varies with the level of the signals of the first formant region, this voltage being produced by an amplitude detector 125, with a low-bandpass filter 126, connected to the channel 22 and by the level voltages of the signals in the formant regions of 800–2000 c./s. and 2000–3200 c./s. respectively, which voltages are obtained from the amplitude detectors 102, 104 and 103, 105 respectively.

The output voltages of the band expansion channels 23 and 24 are supplied to a reproducing device 133, by way of filters 127 and 128 respectively, together with the signals of the first formant region obtained from a single-sideband modulator 129 with the connected local oscillator 130 with a frequency of 32 kc./s. and an output filter 131, via a low-frequency amplifier 132. As described with reference to FIG. 1, the band compression and the band expansion of this system are obtained in the same manner.

It should be noted here that the oscillation, which serves for the band shift and which is varied in the frequencies between 5.5–4.8 kc./s. and 4.3–3.6 kc./s., may be produced not only by frequency detection in the frequency detectors 100 and 101 and by subsequent frequency modulation of the oscillators 106 and 107, but also in a different manner, i.e. by enhancing the frequency sweep of 30 c./s of the incoming frequency-modulated oscillation by frequency multiplication by a factor of, for example, 24 and a subsequent frequency transposition so that the oscillation varying in the frequency bands of about 5.5–4.8 kc./s. and 4.3–3.6 kc./s. are produced.

Figure 6:
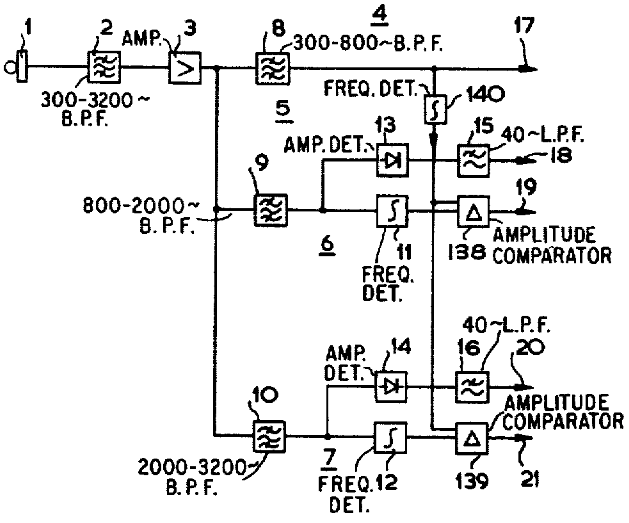
FIG. 6 shows a further embodiment of a transmitter in a transmitting apparatus according to the invention.

FIG. 6 shows a variant of the transmitter shown in FIG. 1 in a transmission system according to the invention, in which an improvement in transmission quality is obtained. Elements corresponding to those of FIG. 1 are designated by the same reference numerals.

The improvement in transmission quality is obtained in the system described by considering, in the band shift, the variation of the formant frequency in the first formant region, i.e. by compensating the variation of the formant frequency in the formant regions of 800–2000 c./s. and 2000–3200 c./s. with the variation of the formant frequency in the formant region of 300–800 c./s.

This is achieved by deducting from the output voltage of the formant-frequency detectors 11, 12 of the band compression channels 6 and 7 respectively, in an amplitude comparison device 138, 139 respectively, the output voltage of a formant frequency detector 140, which is connected to the channel 5. Thus the band shift in the band expansion channels 23 and 24 (see FIG. 1) is reduced by the variation of the formant frequency in the lowest formant region and it has been found that the compensation described of the band shift improves the transmission quality. The frequencies of the local oscillators 32 and 33 in the band expansion channels 23 and 24 respectively may be varied within a larger frequency range.

Instead of producing the compensation voltage, as in the embodiment shown, at the transmitter end, it may be produced at the receiver end. To this end, for example in the embodiment shown in FIG. 1, a formant frequency detector may be connected to the receiving channel 22 to produce a voltage varying with the formant frequency of the formant region of 300–800 c./s., which voltage is fed, as a compensation voltage, to the reactance devices 150 and 34 in the band expansion channels 23 and 24 respectively.

For the sake of completeness it should be noted that with a view to the transmission quality it is advantageous to use selective filters in the transmission channel for the signals of the formant region of 300–800 c./s., of which filters the flank steepness in the pass range of 300 to 800 c./s. is less abrupt.

What is claimed is:

1. A transmission system for speech signals comprising a transmitter having a band compression device, and a receiver having a band expansion device; said band compression device comprising a plurality of channels, means applying signals of different formant regions to said channels, one of said channels passing signals without compression, the remainder of said channels each comprising a formant frequency detector for providing an output voltage varying with the frequency of the signal of the respective formant region, said receiver comprising means for receiving the signal output of said one channel and said output voltage of the remainder of said channels, said band expansion device comprising means for passing signals without expansion, means for shifting the signal output of said one channel within the frequency band of said one channel to the frequency band of each of the other formant regions and for varying the frequency of the shifted signals in each of the other formant region bands in response to the output voltage of the channel corresponding to the respective formant region, and means for combining the signals passed without expansion within the frequency band of said one channel and the output signals of said shifting and frequency varying means.

2. A transmission system for speech signals comprising a transmitter and a receiver, said transmitter comprising a source of speech signals, means for separating said signals into a plurality of signals of different formant frequency ranges, means for passing the signals of the lowest range without compression, formant frequency detector means for providing an output voltage varying with the frequency of the signal of at least one other formant frequency range, said receiver comprising means for receiving said signals of the lowest range and said output voltage, means for passing the signals of said lowest range without expansion, means for shifting the signals of said lowest range within the formant frequency range of said lowest range to the range of said other formant frequency range and for varying the frequency of the frequency shifted signals in response to said output voltage, and means for combining said signals of said lowest frequency range and the output signals of said shifting and frequency varying means.

3. A transmission system for speech signals comprising a transmitter and a receiver, said transmitter comprising a source of speech signals, means for separating said signals into a plurality of signals of different formant frequency ranges, means for passing the signals of the lowest range without compression, formant frequency detector means for providing an output voltage varying with the frequency of the signal of at least one other formant frequency range, said receiver comprising means for receiving said signals of the lowest range and said output voltage, means for passing the signals of said lowest range without expansion, means for shifting a portion of the signals of said lowest range to the range of said other formant frequency range and for varying the frequency of the frequency shifted signals in response to said output voltage, and means for combining said signals of said lowest frequency range and the output signals of said shifting and frequency varying means, said formant frequency detector comprising first and second parallel-connected channels, said first channel comprising in the order named a differentiating network, and an amplitude detector with a low-pass filter, said second channel comprising an amplitude detector with a low-pass filter, and ratio meter means connected to said first and second channels to provide an output voltage dependent upon the ratio of the output voltages of said first and second channels.

4. A transmission system for speech signals comprising a transmitter and a receiver, said transmitter comprising a source of speech signals, means for separating said signals into a plurality of signals of different formant frequency ranges, means for passing the signals of the lowest range without compression, formant frequency detector means for providing an output voltage varying with the frequency of the signal of at least one other formant frequency range, said receiver comprising means for receiving said signals of the lowest range and said output voltage, means for passing the signals of said lowest range without expansion, means for shifting a portion of the signals of said lowest range to the range of said other formant frequency range and for varying the frequency of the frequency shifted signals in response to said output voltage, and means for combining said signals of said lowest frequency range and the output signals of said shifting and frequency varying means, said formant frequency detector comprising a limiting device, a differentiating network connected to the output of said limiting device, a threshold device connected to said differentiating network to provide output pulses, and means applying said pulses of one polarity to low-pass filter means to provide an output voltage varying with formant frequency.

5. A transmission system for speech signals comprising a transmitter and a receiver, said transmitter comprising a source of speech signals, means for separating said signals into a plurality of signals of different formant frequency ranges, means for passing the signals of the lowest range without compression, formant frequency detector means for providing an output voltage varying with the frequency of the signal of at least one other formant frequency range, said receiver comprising means for receiving said signals of the lowest range and said output voltage, means for passing the signals of said lowest range without expansion, means for shifting a portion of the signals of said lowest range to the range of said other formant frequency range and for varying the frequency of the frequency shifted signals in response to said output voltage, and means for combining said signals of said lowest frequency range and the output signals of said shifting and frequency varying means, said transmitter further comprising second formant frequency detector means for providing a second output voltage varying with the frequency of signals of said lowest range, and amplitude comparison means for reducing the amplitude of said first-mentioned output voltage by said second output voltage.

6. A transmission system for speech signals comprising a transmitter and a receiver, said transmitter comprising a source of speech signals, means for separating said signals into a plurality of signals of different formant frequency ranges, means for passing the signals of the lowest range without compression, formant frequency detector means for providing an output voltage varying with the frequency of the signal of at least one other formant frequency range, said receiver comprising means for receiving said signals passed without compression and said output voltage, means for passing the signals of said lowest range without expansion, means for transposing the signals of said lowest range within the formant frequency range of said lowest range to a different range, oscillator means providing oscillations variable in frequency with said output voltage, means mixing said oscillations and transposed signals to provide signals of variable frequency within said other formant frequency range, and means combining said last-mentioned signals and said signals of said lowest frequency range.

7. A transmission system for speech signals comprising a transmitter and a receiver, said transmitter comprising a source of speech signals, means for separating said signals into a plurality of signals of different formant frequency ranges, means for passing the signals of the lowest range without compression, formant frequency detector means for providing an output voltage varying with the frequency of the signal of at least one other formant frequency range, and amplitude detector means for providing a level control voltage varying with the amplitude of signals of said other frequency range, said receiver comprising means for receiving said signals of said lowest range, said output voltage, and said level control voltage, means for passing the signals of said lowest range without expansion, means for shifting the signals of said lowest range within the formant frequency range of said lowest range to the range of said other formant frequency range and for varying the frequency of the frequency shifted signals in response to said output voltage, amplitude modulator means for varying the amplitude of said frequency varied and frequency shifted signals in response to said level control voltage, and means combining the said signals of said lowest frequency range and said amplitude modulated signals.

8. The transmission system of claim 7, comprising low-pass filter means connected to limit the frequency of said level control voltage to a maximum of 40 cycles per second.

9. A transmission system for speech signals comprising a transmitter and a receiver, said transmitter comprising a source of speech signals, means for separating said signals into a plurality of signals of different formant frequency ranges, means for passing the signals of the lowest range without compression, formant frequency detector means for providing an output voltage varying with the frequency of the signal of at least one other formant frequency range, said receiver comprising means for receiving said signals of said lowest range and said output voltage, means for passing the signals of said lowest range without expansion, means for shifting a portion of the signals of said lowest range to the range of said other formant frequency and for varying the frequency of the frequency shifted signals in response to said output voltage, a source of noise voltages having a frequency range within said other formant frequency range, a consonant detector, normally cut-off mixer means for modulating said noise voltage with the output of said consonant detector, and means combining said signals of said lowest frequency range, the output signals of said shifting and frequency varying means, and said modulated noise voltage.

10. The transmission system of claim 9, comprising means providing a voltage proportional to the amplitude of the signals of said other formant frequency range, said consonant detector comprising amplitude comparison means for comparing said proportional voltage with the level of signals of said lowest range.

11. A transmission system for speech signals comprising a transmitter and a receiver, said transmitter comprising a source of speech signals, means for separating said signals into a plurality of signals of different formant frequency ranges, means for passing the signals of the lowest range without compression, formant frequency detector means for providing an output voltage varying with the frequency of the signal of at least one other formant frequency range of said lowest range to the range means for modulating said signals of said lowest frequency range, oscillator means, means varying the frequency of said oscillator in response to said output voltage, and means combining the variable oscillations and the single sideband output of said modulator means, said receiver comprising means for receiving said combined variable oscillations and single sideband signals, means for separating said single sideband signals and variable oscillations, means demodulating said single sideband signals, frequency detector means providing a voltage proportional to the frequency of said oscillations, means for shifting said single sideband signals within the format frequency range of said lowest range to the range of the other formant frequency range, and for varying the frequency of said frequency shifted signals in response to said proportional voltage, and means for combining said demodulated single sideband signals and the output of said shifting and frequency varying means.

12. The transmission system of claim 11, comprising amplitude detector means for producing a level control voltage in said transmitter proportional to the amplitude of signals of said other formant range, means amplitude modulating said variable oscillations with said level control voltage in said transmitter, means for amplitude detecting said variable oscillations in said receiver to produce an amplitude control voltage, and means in said receiver for amplitude modulating the shifted sideband signals with said amplitude control voltage.

References Cited in the file of this patent

UNITED STATES PATENTS

| | | |
|---|---|---|
| 2,098,956 | Dudley | Nov. 16, 1937 |
| 2,151,091 | Dudley | Mar. 21, 1939 |
| 2,817,711 | Feldman | Dec. 24, 1957 |
| 3,003,037 | De Jager et al. | Oct. 3, 1961 |

UNITED STATES PATENT OFFICE
CERTIFICATE OF CORRECTION

Patent No. 3,102,929 September 3, 1963

Frank de Jager et al.

It is hereby certified that error appears in the above numbered patent requiring correction and that the said Letters Patent should read as corrected below.

Column 10, line 71, strike out "of said lowest range to the range" and insert instead -- , single sideband modulator --.

Signed and sealed this 31st day of March 1964.

(SEAL)
Attest:

ERNEST W. SWIDER
Attesting Officer

EDWARD J. BRENNER
Commissioner of Patents